Oct. 9, 1934.  S. FRIESEN  1,976,552
PORTABLE SPOT WELDING DEVICE
Filed April 12, 1932
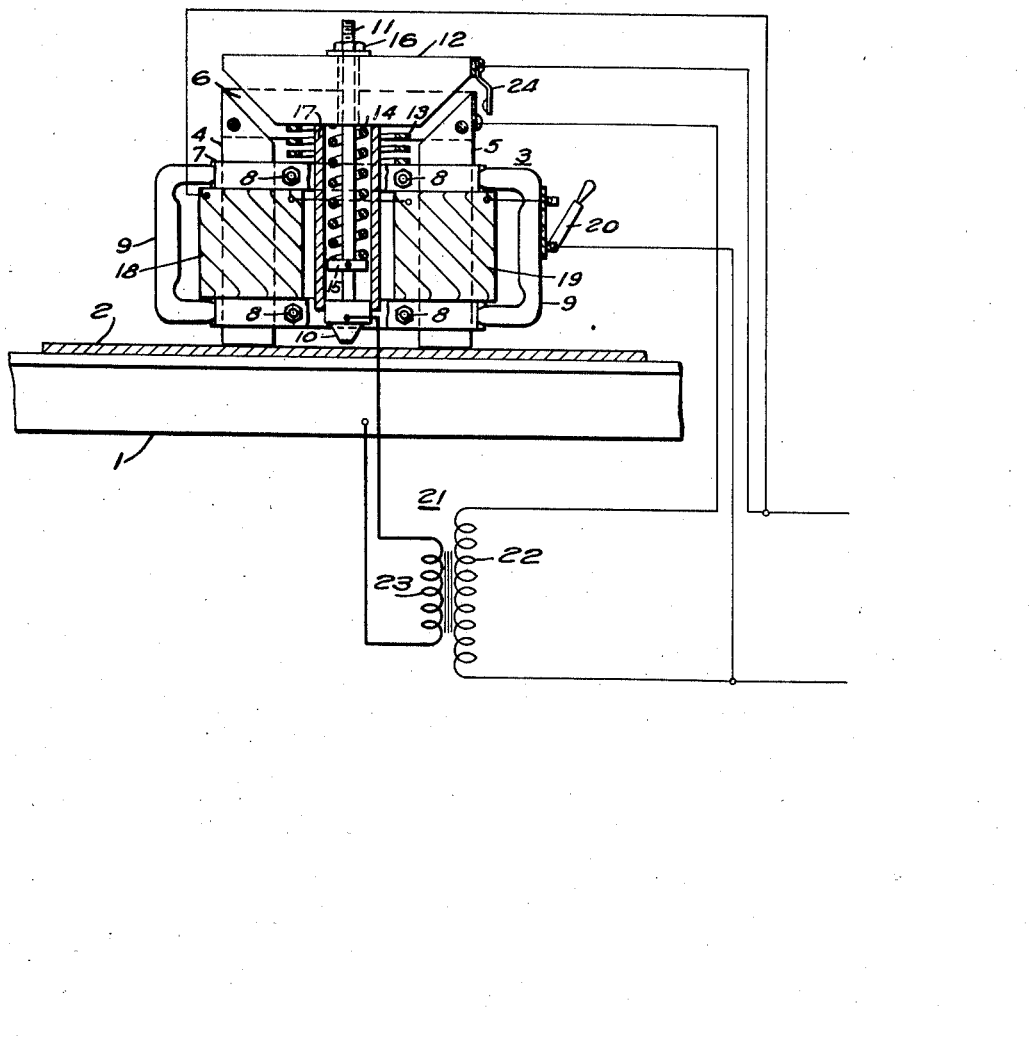
WITNESSES:
INVENTOR
Santiago Friesen.
ATTORNEY Patented Oct. 9, 1934

1,976,552

UNITED STATES PATENT OFFICE 1,976,552

PORTABLE SPOT-WELDING DEVICE

Santiago Friesen, Limbach, near Schwabach, Germany, assignor to Westinghouse Electric & Manufacturing Company, a corporation of Pennsylvania Application April 12, 1932, Serial No. 604,701
In Germany July 9, 1931

6 Claims. (Cl. 219—4)

This invention relates generally to welding apparatus and it has particular relation to portable spot welding apparatus.

One of the objects of this invention is to provide portable spot welding apparatus which shall be simple and efficient in operation and readily and economically manufactured and used.

The principal object of this invention is to provide for electromagnetically holding a portable spot welding apparatus in a predetermined position on work on which a welding operation is to be performed and simultaneously moving the electrode into engagement with the work to perform the welding operation.

Other objects of the invention will, in part, be obvious and, in part appear hereinafter.

The invention, accordingly, is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

For a more complete understanding of the nature and scope of the invention, reference may be had to the following detailed description taken in connection with the accompanying drawing, in which the single figure is a view, partially in section and partially in side elevation, showing a portable spot welder constructed in accordance with this invention.

Referring now to the drawing, the numerals 1 and 2 designate members, constructed of magnetic material, which are to be spot welded together.

The apparatus for performing the spot welding operation comprises a main frame, shown generally at 3, which is composed of magnetizable holding members 4 and 5 that are secured together at the top by means of cross members 6. The holding members 4 and 5 are further maintained in position by means of a frame 7 which is mounted, as shown in the drawing, transversely with respect to the holding members 4 and 5 and is provided with through bolts 8. The cross members 6 and the frame 7 are preferably constructed of non-magnetizable material for a purpose to be set forth hereinafter.

In order to provide for readily moving the apparatus from place to place over the work to be welded, handles 9 are provided which, according to this invention, form an integral part of the frame 7. However, it will be readily understood that other suitable arrangements of the frame 7 and the handles 9 may be made in order to practice this invention.

The welding operation is performed by means of a welding electrode 10 which is carried by a threaded rod 11 that, in turn, is supported by means of a movable armature 12 mounted above the holding members 4 and 5 and arranged to seat on them when moved into engagement therewith. The armature 12 is biased to the position shown in the drawing by means of a spring 13 which is located between the underside of the armature 12 and the upper side of the frame 7.

With a view to providing for irregularities that may exist in the surface of the member 2 which is to be welded to the member 1 and, further, to provide a flexible connection between the electrode 10 and the armature 12 to permit their relative movement, a spring 14 is positioned between the underside of the armature 12 and a washer 15 which is secured to the rod 11. A nut 16 is provided on the threaded portion of the rod 11 to adjust the compression of the spring 14 and the distance between the work and the tip of the electrode 10. The electrode 10 is maintained in the desired position by means of a guide tube 17 within which it may slide and which may be secured to the armature 12 by any suitable means.

In order to hold the welding apparatus in any desired location on the material to be worked, and, in addition, to move the electrode 10 into engagement with the material, windings 18 and 19 are mounted on the holding members 4 and 5, respectively, and within the frame 7. The windings 18 and 19 may be energized from any suitable current source and a switch 20 is provided on the handle 9, as shown, for connecting them to the current source. It will be observed that the armature 12 will be moved downwardly on energization of the windings 18 and 19, together with the electrode 10, until the latter engages the member 2. Further movement of the electrode 10 is then arrested while the armature 12 continues to move, compressing the spring 14, until the armature 12 is seated on the holding members 4 and 5.

According to this invention alternating current is utilized for performing the spot welding operation and a transformer, shown generally at 21, is provided having a primary winding 22 for connection to a suitable power source and a secondary winding 23 for connection to the welding electrode 10 and the work to be welded. However, it will be readily understood that direct current may be utilized instead of alternating current for performing the welding operation.

It is desirable to apply the welding current to the electrode 10 after it is in engagement with the work and to shut off the current before it has moved out of engagement therewith in order to prevent arcing between the electrode and the work. Therefore, a contact device 24 is provided having fixed and movable contact members mounted, respectively, on the holding member 5 and the armature 12 and insulated therefrom as shown. The contact device 24 is connected in series-circuit relation with the primary winding 22 and is arranged to complete the connection to the power source after the electrode 10 has engaged the work and to break the connection to the power source before the electrode has moved out of engagement with the work.

In operation, the portable spot welding apparatus is moved to the position where it is desired to perform the welding operation. The switch 20 is closed by the operator and the members 4 and 5 are immediately magnetized, thereby holding the apparatus in the desired location on the work. At the same time the armature 12 is moved downwardly and the electrode 10 engages the work after which the contact device 24 is closed on further movement of the armature 12 and welding current is applied for performing the welding operation. When the welding current has been applied for a sufficient length of time, the switch 20 is opened, thereby de-energizing the windings 18 and 19. The spring 13, which was compressed when the armature was moved downwardly, causes the armature 12 to move upwardly opening the welding circuit by means of the contact device 24 and then removing the electrode 10 from engagement with the work. The apparatus may then be moved to another position where the same operation can again be carried out.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. In portable apparatus for spot welding, in combination, a movable armature, a magnetizable supporting frame for the armature disposed to be positioned upon the work on which a welding operation is to be performed, a welding electrode carried by the armature, and electro-magnetic means carried by the frame and disposed to magnetize the frame, thereby simultaneously securing it in a predetermined position on the work and effecting the operation of the armature to actuate the electrode into engagement with the work.

2. In portable spot welding apparatus, in combination, a magnetizable frame arranged to engage work on which a welding operation is to be performed, a movable electrode slidably mounted on the frame, electromagnetic means mounted on the frame, and circuit means for connecting the electromagnetic means to a current source to magnetize the frame thereby securing it in a predetermined position on the work and simultaneously causing the electrode to engage the work.

3. In portable spot welding apparatus, in combination, a magnetizable frame arranged to engage work on which a welding operation is to be performed, a movable electrode slidably mounted on the frame, electromagnetic means mounted on the frame, circuit means for connecting the electromagnetic means to a current source to magnetize the frame thereby securing it in a predetermined position on the work and simultaneously causing the electrode to engage the work, a welding circuit connected to the electrode and to the work, and circuit closing means operable after engagement of the electrode with the work to complete the welding circuit thereby causing current to flow to perform the welding operation.

4. In portable apparatus for spot welding, in combination, a movable armature, a frame comprising a pair of magnetizable holding members forming a seat for the armature and disposed to engage the work being welded, a spring interposed between the armature and the frame for biasing the former to a predetermined position, a welding electrode slidably carried by the armature and resiliently secured thereto, a pair of coils, each surrounding a holding member, for magnetizing the holding members to effect the operation of the armature thereby actuating the electrode into engagement with the work and to secure the frame in a predetermined position on the work, a welding circuit connected to the electrode and to the work, and circuit-closing means carried by the armature and disposed to complete the welding circuit after the electrode engages the work, when the coils are energized, and to open the circuit before the electrode disengages the work, when the coils are de-energized.

5. In portable spot welding apparatus, in combination, a magnetizable frame arranged to engage work on which a welding operation is to be performed, an armature operatively mounted on the frame, an electrode carried by the armature, electromagnetic means mounted on the frame, a current source disposed to be connected to the electromagnetic means to magnetize the frame thereby securing it in a predetermined position on the work and simultaneously attracting the armature thereby causing the electrode to engage the work, a transformer provided with a secondary winding connected to the electrode and to the work and a primary winding for connection to the current source, and circuit-closing means connected between the primary winding and the current source and operable after engagement of the electrode with the work to complete the connection of the primary winding to the current source thereby causing current to flow to perform the welding operation.

6. In portable spot welding apparatus, in combination, a magnetizable frame arranged to engage work on which a welding operation is to be performed, an armature operatively mounted on the frame, an electrode carried by the armature, electromagnetic means mounted on the frame, a current source disposed to be connected to the electromagnetic means to magnetize the frame thereby securing it in a predetermined position on the work and simultaneously attracting the armature thereby causing the electrode to engage the work, a transformer provided with a secondary winding connected to the electrode and a primary winding for connection to the current source, and circuit closing means connected between the primary winding and the current source and operable after engagement of the electrode with the work to complete the connection of the primary winding to the current source thereby causing current to flow to complete the welding operation, said circuit closing means also operable to open the connection of the primary winding to the current source before the welding electrode is disengaged from the work.

SANTIAGO FRIESEN.